Patented Jan. 10, 1933

1,894,136

UNITED STATES PATENT OFFICE

CHAPLIN TYLER AND FRANK W. PARKER, OF WILMINGTON, DELAWARE, ASSIGNORS TO E. I. DU PONT DE NEMOURS & COMPANY, OF WILMINGTON, DELAWARE, A CORPORATION OF DELAWARE

FERTILIZER MANUFACTURE

No Drawing.   Application filed April 23, 1931. Serial No. 532,273.

This invention relates to fertilizers and more particularly to the production of nitrogenous phosphatic fertilizers.

It is known that valuable fertilizer materials, generally referred to as superphosphates and consisting in large part of monocalcium phosphate, may be obtained by decomposing phosphate rock with one or more of the mineral acids, such as, for example, sulfuric, nitric, phosphoric, and hydrochloric acid. In employing these products in the manufacture of finished fertilizers, it is customary to add to the superphosphate one or more nitrifying agents. In the latter connection the fertilizer industry has recently adopted the practice of adding to superphosphate commercial, anhydrous or aqua ammonia, this "ammoniated" superphosphate being then incorporated with additional inorganic nitrogen, with organic nitrogen (in the form of tankage, fish scrap, etc.) and with potash, generally requisite for a complete fertilizer. The ammoniation of superphosphate has thus served to establish the use of liquids as carriers of plant food for the fertilizer industry. However, the amount of nitrogen that can be added to superphosphate in the form of anhydrous or aqua ammonia is limited by the reversion of citrate soluble to citrate insoluble phosphoric acid and the absorptive capacity of the superphosphate for free ammonia, and is, in fact, less than 50% of the total nitrogen contained in the average complete fertilizer. Additional nitrogen must accordingly be added in another form and from a different source. It is desirable, therefore, to have a single liquid material that will satisfy all or a larger part of the nitrogen requirements of the fertilizer manufacturer.

It is an object of the present invention to provide an improved superphosphate nitrifying agent in liquid form and containing both inorganic and organic nitrogen.

It is a further object of the invention to provide a process for the production of such nitrifying agents and an improved process employing the same in the manufacture of a finished fertilizer.

Other objects and advantages of the invention will be more fully apparent from the following specification in which its preferred embodiments are described.

The improved superphosphate nitrifying agent comprises an ammoniacal solution of urea, the composition and mode of preparation of which may be varied widely as is more fully hereinafter indicated. From the standpoint of the fertilizer manufacture these liquids have important practical advantages. Containing, as they do, both inorganic and organic nitrogen in a highly concentrated form they permit of the introduction, in a single operation, of both forms of nitrogen into the superphosphate fertilizer base; and since the relative proportions of ammonia and urea may be varied, they afford a valuable flexibility in meeting the different inorganic and organic nitrogen requirements of fertilizer formulæ. Liquids containing ammonia and urea in a ratio within the range of from 0.5:1 to 3:1 parts by weight have been found to be particularly useful for the purpose; these values correspond to ratios of inorganic to organic nitrogen of from substantially 1:1 to 5:1.

Solutions of the character referred to may be prepared, for example, by dissolving urea in the liquid or anhydrous ammonia of commerce. It is of major practical importance that these solutions generally are of a relatively high density, such that in fact a unit volume thereof contains a higher weight of total ammonia (free and fixed, i. e. as urea) than does an equal volume of anhydrous ammonia. Thus in all handling of the materials, i. e. storage, transportation, and actual use, economies in equipment and operating expense are effected, as compared with the use of liquid ammonia. A further advantage accrues from the fact that these solutions have a lower vapor pressure than anhydrous ammonia and as a result can be stored, transported and used in relatively simple and inexpensive equipment.

The nitrifying agent can also be prepared by dissolving urea in aqueous ammonia. These solutions likewise have the desirable high density and consequent relatively higher ammonia content than aqueous ammonia and are further characterized by a materially lower vapor pressure than that of the anhydrous ammonia-urea solutions. Solutions of varying water content may be used, but the water should preferably not exceed 60% by weight.

As a further feature of the invention we have found that the foregoing nitrifying agent can advantageously be prepared by a method which affords important economies in the manufacture of urea by synthesis from ammonia and carbon dioxide, or their compounds. In this synthesis ammonia and carbon dioxide, as such or, for example, in the form of ammonium carbamate, are submitted to the combined influence of elevated temperature and pressure, usually in the presence of a considerable excess of ammonia, whereby, depending upon the specific conditions of operation, varying proportions of urea are formed. Inasmuch as, from the nature of the equilibrium, it is impossible to obtain complete conversion to urea, it has been customary to subject the synthesis melt to distillation for the purpose of removing excess ammonia and recovering unconverted ammonium carbamate, both being thereafter submitted again to urea-forming conditions. The residue from this distillation consists of a relatively concentrated solution of urea (water having been formed in the synthesis) from which solid urea is recovered by evaporation, or other suitable water-removing methods, followed by granulation, shotting, etc.

According to one embodiment of the invention the hitherto necessary water-removing step above referred to is eliminated, while at the same time by adding ammonia, and water, if desired, to the concentrated urea solution obtained on distillation of the unconverted ammonium carbamate from the synthesis melt urea is thus obtained in a liquid form more useful for fertilizer manufacture than in the granular or solid form customarily used. In this manner the undesirable handling characteristics of granular or solid urea are eliminated, and particularly the difficulties arising from its hygroscopicity. The amount of ammonia added may be varied depending upon the desired ratio of inorganic to organic nitrogen in the nitrifying agent.

According to another feature of the invention still further economies are effected in the urea synthesis while producing liquid nitrifying agents. The recovery and reutilization of excess ammonia, if any, and unconverted ammonium carbamate, previously referred to, have hitherto been essential but costly elements of the urea synthesis. The separation of the ammonia and the carbamate from the synthesis melt and the reprocessing thereof have been regarded as necessary to the attainment of anything approaching economical utilization of the raw materials, but, on the other hand, the expense of distilling, condensing, reheating, and reconveying these materials to the synthesis has been a large factor in the over-all cost of urea manufacture. It has now been found that not only the final separation of urea but also the distillation and recovery of carbamate, and any excess ammonia, can be eliminated and the synthesized urea can be obtained in the form of a valuable liquid nitrifying agent by modifying the melt to ensure liquidity thereof at ordinary temperatures. This modification is, according to the invention, effected by adding to the melt ammonia and/or water. Whether one or the other or both of the materials is added, will depend upon the necessity for addition of water to produce liquidity, and the relation between the inorganic to organic nitrogen ratio of the melt and the corresponding ratio desired in the nitrifying agent. For example, if the nitrogen ratio of the melt is satisfactory, water alone may be added; if the inorganic nitrogen content of the melt is too high, a suitable proportion of the ammonia may be distilled and water added to the residue.

Fertilizers are produced according to the present invention by mixing the liquid nitrifying agent, prepared as before described, with suitable proportions of a superphosphate in a mixing drum or the like, the proportions employed being subject to considerable variation depending largely upon the desired chemical composition of the final product. In manufacturing fertilizers according to the invention it has been found not only that the advantages hereinbefore referred to are obtained, but also that, as compared with processes involving the separate addition of the same ingredients, a lower maximum temperature on ammoniation and a lower hygroscopicity of the product result. The lower temperature of ammoniation is important in that the reversion of available $P_2O_5$ as well as decomposition of urea in storage is considerably reduced. The lower hygroscopicity is of obvious importance in the storage, handling, and distribution of the fertilizers.

The following examples will illustrate the practice of the invention, although the invention is not limited to the examples.

*Example 1*—A urea-ammonia solution of a ratio of 2:1 inorganic to organic nitrogen was prepared by dissolving 47.2 parts by weight of urea in 52.8 parts of anhydrous ammonia. The resultant solution was added in the ratio of 189 lbs. thereof to 2000 lbs. of superphosphate (18% available $P_2O_5$) in a mixing drum during the usual mixing cycle of about a minute to produce a relatively free flowing and non-hygroscopic fertilizer containing a total of 5.65% nitrogen. The total nitrogen content calculated as ammonia was about 6.8% of which about 4.5% was derived from ammonia itself and about 2.3% was derived from urea.

*Example 2*—A solution having a ratio of 4:1 inorganic to organic nitrogen was prepared by dissolving 30.9 parts by weight of urea in 69.1 parts of anhydrous ammonia. This solution was added in the ratio of 86.9 lbs. thereof to 2000 lbs. of commercial superphosphate (18% available $P_2O_5$) in a mixing drum during the usual mixing cycle, to produce a finished fertilizer containing nitrogen equivalent to about 3.6% ammonia of which about 2.9% was derived from ammonia itself and 0.7% was derived from urea.

*Example 3*—A solution having an inorganic to organic nitrogen ratio of 1.5:1 is prepared by mixing 34.6 parts by weight of urea, 29 parts of ammonia, and 36.4 parts of water. On adding this solution to superphosphate (18% available $P_2O_5$) in the ratio of 208 pounds solution to 2000 pounds of superphosphate in a mixing drum during the usual mixing cycle a relatively free flowing and non-hygroscopic fertilizer is obtained having a total nitrogen content of 3.8%. The total nitrogen content calculated as ammonia is 4.6%, of which 2.76% is derived from ammonia itself and the balance derived from urea.

*Example 4*—On distilling unconverted ammonium carbamate from the synthesis melt resulting from the reaction of ammonia and carbon dioxide at a temperature of 150° C. and a pressure of 100 atmospheres, there is obtained a residual solution consisting of 77% urea and 23% water. To 100 parts of the concentrated urea solution are added 101.2 parts of water and 86.2 parts of anhydrous ammonia. The resultant nitrifying agent has an inorganic to organic nitrogen ratio of 2:1 and a vapor pressure of only about 2 atmospheres absolute at 20° C. The solution is added to ordinary superphosphate (18% available $P_2O_5$) in a mixing drum during the usual mixing cycle in the proportions of 310 pounds of nitrifying agent to 2000 pounds of superphosphate to yield a finished fertilizer containing nitrogen equivalent to about 6% ammonia (4% of which is derived from ammonia itself and 2% from urea).

*Example 5*—By reaction of 69.6 parts by weight of ammonia and 30.5 parts of carbon dioxide, at a temperature of 150° C. and a pressure of about 100 atmospheres, there is obtained a synthesis melt having the following approximate composition: ammonia 46%, urea 34%, water 10%, ammonium carbamate 10%. By treating 100 parts by weight of this melt in the several manners indicated below there are obtained nitrifying agents, liquid at ordinary temperatures, of varying ratios of free to fixed ammonia.

(A) Add 6.5 parts of ammonia and 50 parts of water. The inorganic to organic nitrogen ratio is 3:1.

(B) Distill 12 parts of ammonia and add 30.5 parts of water. The inorganic to organic nitrogen ratio is 2:1.

(C) Distill 21.7 parts of ammonia and add 20 parts of water. The inorganic to organic nitrogen ratio is 1.5:1.

(D) Distill 31.3 parts of ammonia and add 36 parts of water. The inorganic to organic nitrogen ratio is 1:1.

*Example 6*—By reaction of 142.8 parts by weight of ammonia and 92.4 parts of carbon dioxide, at a temperature of 170° C. and a pressure of about 133 atmospheres, there is obtained a synthesis melt having the following approximate composition: ammonia 30%, urea 38%, ammonium carbamate 21%, and water 11%. By treating 100 parts by weight of this melt in the several manners indicated below there are obtained nitrifying agents, liquid at ordinary temperatures, of varying ratios of free to fixed ammonia and varying vapor pressures and total ammonia content.

(A) Add 25 parts of water. The inorganic to organic nitrogen ratio is 1.83:1. The vapor pressure is relatively low and the total nitrogen content calculated as ammonia is 48.5 per cent.

(B) Add 20 parts of ammonia. The inorganic to organic nitrogen ratio is 2.73:1. The content calculated as ammonia is 67 per cent.

(C) Add 20 parts of ammonia and 45.5 parts of water. The inorganic to organic nitrogen ratio is 2.73:1. The vapor pressure is relatively low and the nitrogen content calculated as ammonia is 48.5 per cent.

The foregoing solutions are employed in the manufacture of finished fertilizers by treatment of superphosphate therewith in the general manner previously described.

Other ingredients may, if desired, be incorporated in the fertilizer as, for example, salts of potash, animal refuse, night soil, fillers, etc., these being introduced either before, or during, or after treatment of the superphosphate with the nitrifying agent. Any of the various superphosphates may be used in the manufacture of the fertilizer.

Various changes may be made in the compositions hereinbefore described as well as in the method for preparing and employing the same without departing from the invention or sacrificing any of the advantages thereof.

We claim:

1. A superphosphate nitrifying agent comprising a liquid containing dissolved free ammonia and urea.

2. Process for the production of a fertilizer which comprises incorporating a solution of urea and free ammonia with a superphosphate.

3. A superphosphate nitrifying agent comprising a liquid containing in solution free ammonia, urea, and water.

4. A superphosphate nitrifying agent comprising a liquid containing in solution free ammonia, ammonium carbamate, urea, and water.

5. A process for the production of a superphosphate nitrifying liquid which comprises reacting ammonia and carbon dioxide at urea forming temperatures and pressures and adding water to the resultant melt, the free ammonia content thereof being adjusted so that a ratio of from 1:1 to 5:1 inorganic to organic nitrogen is obtained.

6. A process for the production of fertilizer which comprises reacting ammonia and carbon dioxide at urea forming temperatures and pressures, adding water and adjusting the free ammonia content thereof so that a ratio of from 1:1 to 5:1 inorganic to organic nitrogen is obtained and incorporating the resultant liquid with a superphosphate.

7. A process for the production of fertilizer which comprises incorporating with a superphosphate a liquid containing dissolved free ammonia and urea.

8. A process for the production of fertilizer which comprises incorporating with a superphosphate a liquid containing free ammonia, urea and water in solution.

9. A process for the production of fertilizer which comprises incorporating with a superphosphate a liquid containing free ammonia, ammonium carbamate, urea, and water in solution.

10. A process for the production of fertilizer which comprises incorporating with a superphosphate a liquid containing in solution free ammonia and urea in a ratio within the range of from 0.5:1 to 3:1 parts by weight.

11. A process for the production of fertilizer which comprises incorporating with a superphosphate a liquid containing in solution free ammonia and urea in a ratio of from 0.5:1 to 3:1 parts by weight and water in the amount of upwards to 60% by weight.

12. A superphosphate nitrifying agent comprising a liquid containing in solution free ammonia and urea in a ratio within the range of from 0.5:1 to 3:1 parts by weight.

13. A superphosphate nitrifying agent comprising a liquid containing in solution free ammonia and urea in a ratio within the range of from 0.5:1 to 3:1 parts by weight and water in the amount of upwards to 60% by volume.

14. A superphosphate nitrifying agent comprising a liquid containing in aqueous solution free ammonia, urea, and ammonium carbamate, the ratio of inorganic to organic nitrogen being within the range of from 1:1 to 5:1.

In testimony whereof we affix our signatures.

CHAPLIN TYLER.
FRANK W. PARKER.

DISCLAIMER 1,894,136.—*Chaplin Tyler* and *Frank W. Parker*, Wilmington, Del. FERTILIZER MANUFACTURE. Patent dated January 10, 1933. Disclaimer filed November 2, 1934, by the assignee, *E. I. du Pont Nemours & Company.*

Hereby enters the following disclaimer:

It disclaims claims 1, 2, 3, 7, and 8 reading:

"1. A superphosphate nitrifying agent comprising a liquid containing dissolved free ammonia and urea.

"2. Process for the production of a fertilizer which comprises incorporating a solution of urea and free ammonia with a superphosphate.

"3. A superphosphate nitrifying agent comprising a liquid containing in solution free ammonia, urea, and water."

"7. A process for the production of fertilizer which comprises incorporating with a superphosphate a liquid containing dissolved free ammonia and urea.

"8. A process for the production of fertilizer which comprises incorporating with a superphosphate a liquid containing free ammonia, urea and water in solution."

[*Official Gazette January 22, 1935.*]